United States Patent [19]
Amaro et al.

[11] Patent Number: 5,883,797
[45] Date of Patent: Mar. 16, 1999

[54] PARALLEL PATH POWER SUPPLY

[75] Inventors: Michael G. Amaro; Joseph G. Renauer, both of Naperville, Ill.

[73] Assignee: Power Trends, Inc., Warrenville, Ill.

[21] Appl. No.: 885,332

[22] Filed: Jun. 30, 1997

[51] Int. Cl.$^6$ ............................ H02M 7/00; G05F 1/40
[52] U.S. Cl. ........................ 363/65; 363/71; 323/268; 323/272
[58] Field of Search ................... 363/65, 71; 323/268, 323/269, 272

[56] References Cited

U.S. PATENT DOCUMENTS

| | | | |
|---|---|---|---|
| 4,092,712 | 5/1978 | Harrigill, Jr. et al. | 363/60 |
| 4,833,341 | 5/1989 | Watanabe et al. | 307/296.1 |
| 4,947,102 | 8/1990 | Elkstrand et al. | 233/293 |
| 4,994,953 | 2/1991 | Haak | 363/71 |
| 5,045,771 | 9/1991 | Kislovski | 323/282 |
| 5,253,155 | 10/1993 | Yamamoto | 363/71 |
| 5,267,136 | 11/1993 | Suga et al. | 363/65 |
| 5,272,612 | 12/1993 | Harada et al. | 363/65 |
| 5,278,490 | 1/1994 | Smedley | 323/284 |
| 5,414,341 | 5/1995 | Brown | 323/268 |
| 5,438,505 | 8/1995 | Cohen | 363/95 |
| 5,512,815 | 4/1996 | Schrader | 323/315 |
| 5,530,635 | 6/1996 | Yashiro | 363/65 |
| 5,583,753 | 12/1996 | Takayma | 363/71 |
| 5,592,076 | 1/1997 | Main et al. | 323/315 |
| 5,610,507 | 3/1997 | Brittan | 323/272 |
| 5,627,459 | 5/1997 | Itoyama et al. | 323/283 |
| 5,659,208 | 8/1997 | Kimble et al. | 363/65 |
| 5,705,919 | 1/1998 | Wilcox | 323/282 |

*Primary Examiner*—Peter S. Wong
*Assistant Examiner*—Bao Q. Vu
*Attorney, Agent, or Firm*—Hill & Simpson

[57] ABSTRACT

A power conversion architecture includes one control capable of simultaneous operation with multiple power conversion circuits. The function of the controlling mechanism includes an output signal proportional to one or more inputs to the controlling mechanism for the purpose of maintaining a destination level at a substantially constant value. The function of each power conversion path is to transfer power from a source to a destination in an amount dictated by the controlling mechanism. The function of the parallel power conversion architecture is to proportionally distribute the power transfer between all power conversion paths.

6 Claims, 7 Drawing Sheets

PARALLEL PATH POWER SUPPLY

BACKGROUND OF THE INVENTION

1. Field of the Invention

The present invention relates generally to a power supply circuit and in particular to a power converting circuit with multiple current paths.

2. Description of the Related Art

A power converter supplies a fixed output voltage to a destination or load regardless of the current drawn by the destination or load. An input or source supplied to the power converter may vary in the voltage or current supplied.

A sample of a known power converter 10 is shown in FIG. 1 in which the power conversion path between the source and the destination includes a power conversion path circuit 12 and a switching regulator 14. The source voltage Vs is input to the power conversion circuit 12 and to the switching regulator 14. The switching regulator 14 also receives a reference voltage 16 as well as feed back from the output destination voltage Vd through a voltage divider 18 and 20. From these inputs, the switching regulator 14 forms an output pulse at 22 which has a duty cycle that is proportional to the difference between the source voltage Vs and the destination voltage Vd. The output pulse controls the time for connection of the source voltage to the destination voltage versus the time for connection of a storage capacitor in the power conversion circuit to the destination voltage. The connection between the source and destination is controlled by a switch having a low impedance at its control input which receives the duty cycle pulse output of the switching regulator. Since the low input impedance of the power conversion circuit draws a substantial amount of current, the switching regulator of the known circuit has a large transistor at the duty cycle pulse output to supply this current.

The destination or load may draw a substantial amount of current. When a single converter embodiment is unable to deliver a sufficient output current to the destination, it would be desirable to provide multiple current paths in the power converter so as to lessen the current load through each path. The multiple paths are achieved with parallel multiple converters 10, as shown in FIG. 2a, such that all converters 10 are connected to the same source voltage Vs to equally transfer power to and maintain the same destination voltage Vd. The converters 10 are each stand alone converters. In the ideal situation, the ability to transfer power equally results in each converter 10 delivering an equal amount of output current to the destination Vd. If equal amounts of current are not delivered from each converter 10, one converter will dissipate substantially more power than the others.

In practice, the parallel converter embodiments of FIG. 2a always fail due to finite differences in the switching regulators 14 controlling the transfer of energy within each converter 10. Differences in the reference voltage 16 presented to each switching regulator 14 along with voltage offsets at various points of amplification within the switching regulator make it impossible for all converters 10 to maintain the same destination voltage. As a result, current sharing is less than optimum and a single converter attempts to deliver all the current to the destination while the other converters deliver negligible amounts.

Many circuit additions have been developed over the years in an effort to make the paralleling method described above work. The most common of these additions is to eliminate the direct connection of the destination voltage Vd outputs of the converters 10 to one another. Instead, a small resistance 24 as shown in FIG. 2b isolates the destination voltage of each converter 10 from the other. This additional isolation resistance 24 results in two very undesirable effects. The first effect reduces the efficiency of the converter and the second effect is that the destination voltage is no longer directly maintained by any of the converter components 10. This last effect results in a destination voltage that varies with output current.

SUMMARY OF THE INVENTION

An object of the present invention is to provide multiple, parallel connected power conversion paths to share proportionally the transfer of power from the source to the destination based purely on the fundamental proportionality of the power converting components within the power conversion paths. In the case of a power supply, the power conversion paths can be comprised of power converting components including solid state switches, inductors, and capacitors with each power converting component considered in its true, non-ideal form.

The controlling mechanism for the present invention is an integrated circuit designed to function as a pulse width modulating switching regulator. The source of power can be a DC voltage source with the destination being a DC voltage, of either greater or lesser value than the source voltage, stored across a capacitor within the power conversion path as an energy reservoir to a load. The destination voltage can be of opposite polarity to the source voltage.

In a basic concept, the invention provides a single control or switching regulator for a plurality of conversion path circuits. The switching regulator provides an output that is connected to all of the conversion circuits so that conversion circuits are under a common control. This eliminates the differences in voltages output from the conversion circuits which result from the use of multiple switching regulators and different reference voltages for each.

However, the switching regulator must then provide an output capable of driving the switching inputs of all the conversion circuits. Since the conversion circuits have low impedance inputs, the current requirements of the duty cycle pulse output of the switching regulator are great. Only a limited number of parallel connected conversion circuits can be connected to a switching regulator without overloading the current capacity of the regulator. Further, the switching regulator must have large transistors to carry the current load.

The present invention provides a solution to these problems as well. In particular, the preferred converter has a high impedance control input for the control signal of the switching regulator. This power conversion circuit, referred to here as a buffered power conversion circuit, draws little current from the switching regulator. Thus, a number of the buffered power conversion circuits may be connected in parallel between the source and the destination, all under control of the single switching regulator and all operating to provide multiple parallel current paths. The current load to the destination is then distributed among the multiple paths. The use of the single switching regulator facilitates an even distribution of the current.

The use of the buffered power conversion circuits provides yet another advantage, in that the switching regulator no longer requires the large current carrying components at its duty cycle pulse output. This eliminates the large transistors, enabling the circuit to be implemented as a logic circuit in an integrated circuit package. The cost for such a logic circuit is considerably lower than a circuit requiring power transistors.

DETAILED DESCRIPTION OF THE PREFERRED EMBODIMENTS

Figure 1:
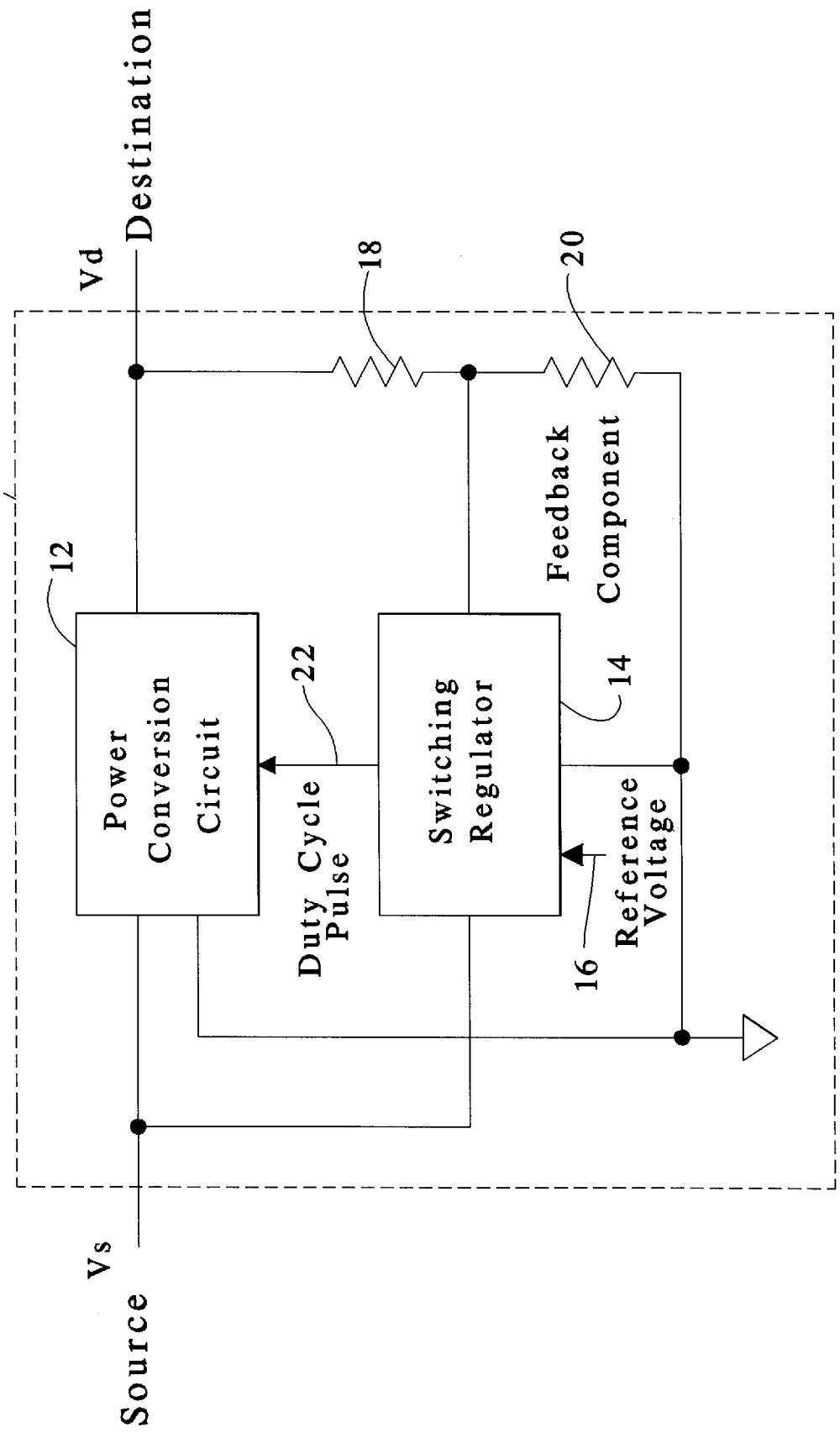
FIG. 1 is a functional block diagram showing a known power converter.
Figure 2A:
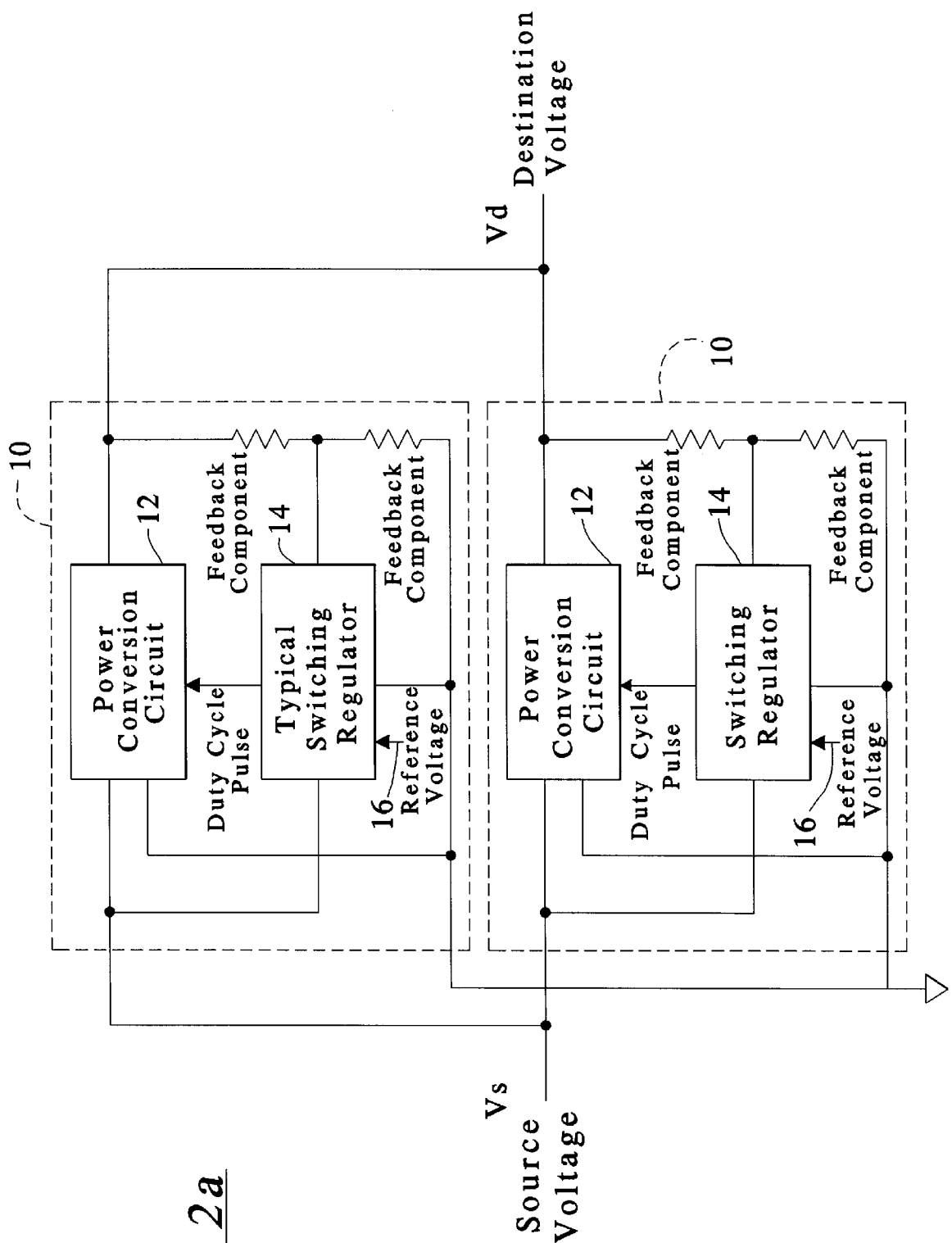
FIGS. 2a and 2b are functional block diagrams showing a pair of the known power converters connected in parallel, FIG. 2b showing the converters with isolation components at the outputs.
Figure 2B:
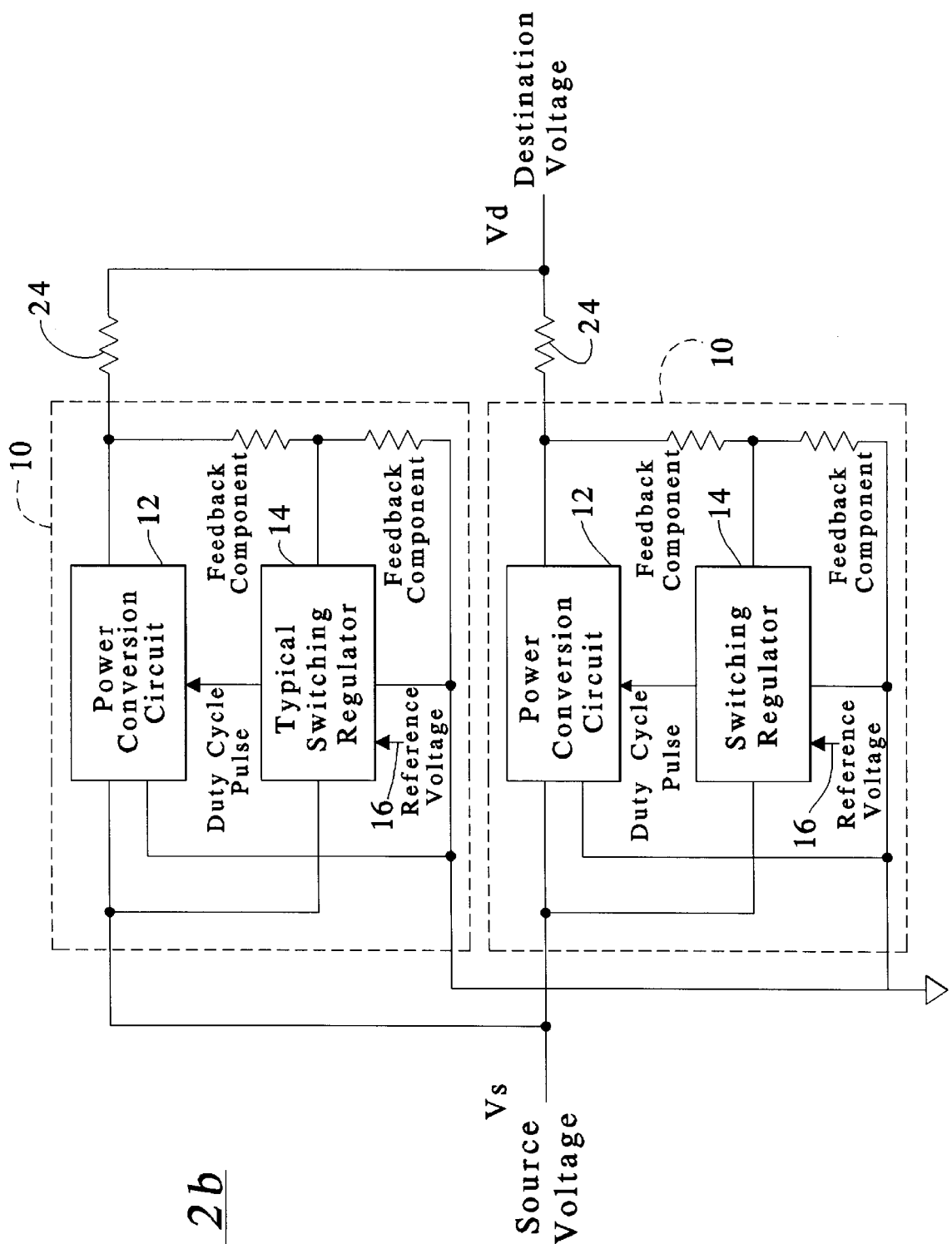
Figure 3:
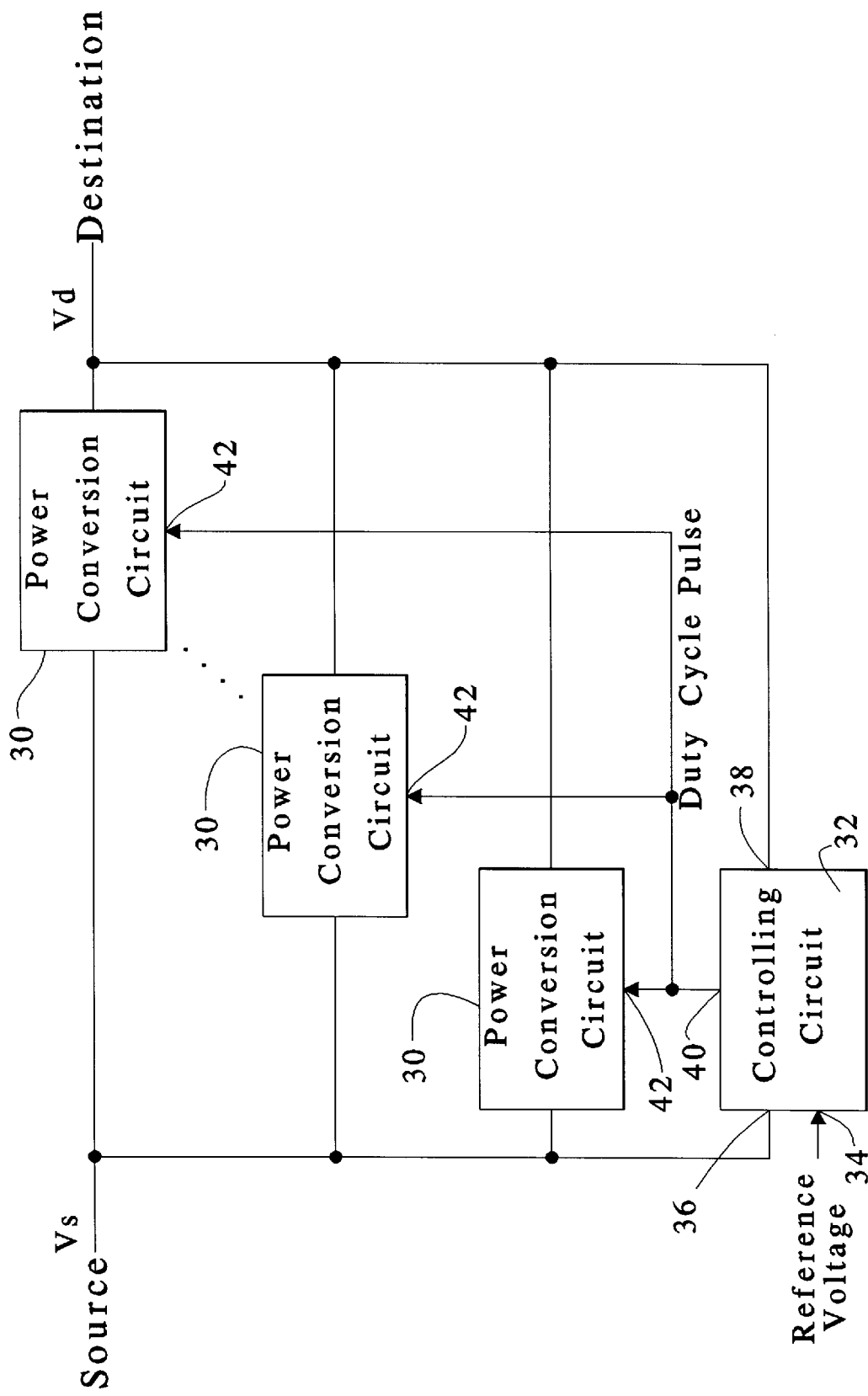
FIG. 3 is a functional block diagram showing parallel power conversion paths connected to a single controller according to the present invention.

Referring first to FIG. 3, parallel power conversion paths are provided with a plurality of power converter circuit units 30 under the control of a single controller 32. The power converters 30 are connected in parallel to one another between the source voltage Vs and the destination voltage Vd. The controller circuit 32, which is in the form of a switching regulator, has an input connected to a reference voltage 34, an input 36 connected to the source voltage Vs and a feedback input 38 connected to the destination voltage Vd. The controller 32 generates a control signal at an output 40 that is forwarded to a control input 42 at each of the power converters 30. Since each of the power converters 30 is under a common control, the voltage Vd at the destination is maintained equally by all of the power converters 30, resulting in substantially equal current flow through each of the power converters 30. The reduced current flow through the individual power converters compared to a single path construction requires a less robust, and thus lower cost, individual power converter circuit. Higher total currents can be delivered using multiple, lower cost, individual power circuits.

Figure 4A:
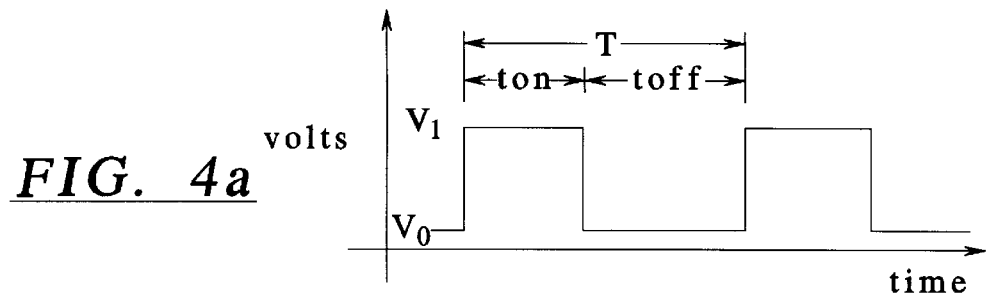
FIGS. 4a, 4b and 4c are graphs of signals of a switching regulator of FIG. 3.

The switching regulator circuit, or controller, 32 functions to maintain the destination voltage Vd at a substantially constant value while the source voltage Vs and current draw by the destination can vary over a predefined range. To perform this, the switching regulator or controller 32 produces a periodic signal at the output 40 consisting of two levels as shown in FIG. 4a. The signal illustrated represents a gate-source voltage of a MOSFET device or a base-emitter voltage of a bipolar device at the output 40 of the controller 32. The two voltage levels, indicated here by V0 and V1, provide digital information to identify and control the state of power converting elements in the power conversion circuit 30. State 1 at voltage V1 is defined as the state during which power is being taken from the source voltage Vs and transferred to the destination Vd by the power converters 30. The State 1 voltage is maintained for a time $t_{on}$. State 2 at voltage V0 is be defined as the duration in time during which power is being transferred to the destination Vd in the form of a voltage stored across a capacitor in the power converters 30. State 2 is maintained for the time $t_{off}$. The pulse period T is the total time of the State 1 and the State 2 pulses ($t_{on}+t_{off}=T$), which provides analog information to identify the duration in time that the power conversion path is to remain in each state.

A dimensionless figure of duty cycle is defined as the duration in time in State 1 divided by the pulse period T. Duty cycle is proportional to the difference between the source voltage Vs and the destination voltage Vd. This difference is established by having a fixed, precise reference voltage available to the switching regulator 32 while monitoring the destination voltage Vd directly or proportionally.

Figure 4B:
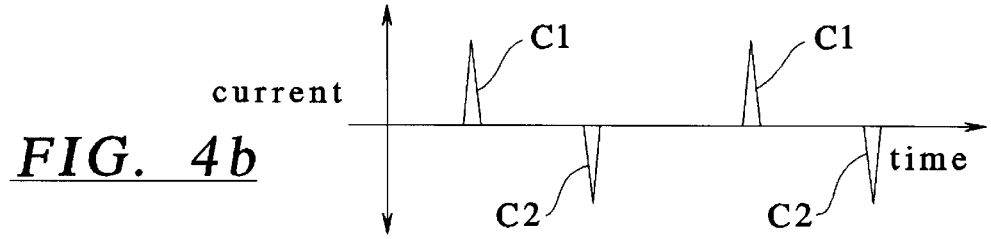

A rapid transition between the two signal levels V0 and V1 must occur. The periodic pulse directly drives switching elements in the power conversion circuits 30 and must possess enough drive capability to change the state of these switches in a time duration substantially less than the duration of either switch state. FIG. 4b is a current diagram of the current drawn from the output 40 of the controller 32 by a MOSFET switching element at the control input 42 of the converter circuits 30. The current spikes C1 and C2 are coincident with the transitions between the State 2 and State 1 voltages and between the State 1 and State 2 voltages, respectively, of the periodic control pulse. A low impedance condition exists during switching for MOSFETs. The switching regulator must be designed to deliver a minimum of 1 Amp. of current.

Figure 4C:
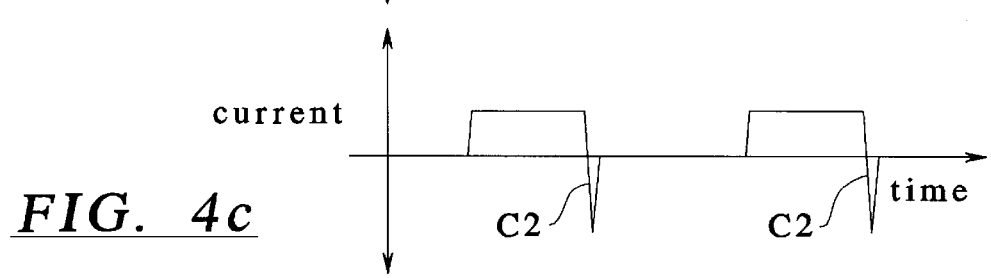

FIG. 4c is a current diagram of the current drawn from the output 40 of the controller 32 by a bipolar switching element at the control input 42 of the converter circuits 30. The current spikes C2 are coincident with the transitions between the State 1 and State 2 voltages of the periodic control pulse. For bipolar devices, low impedance conditions exist during switching and during the on state. A typical device with a current gain of 50 and a collector-emitter current of 5 Amps. requires a minimum of 100 mAmps. of base drive to sustain the on state. Since the on state current drain is sustained, the current required from the switching regulator circuit is very high relative to the MOSFET switching element.

Figure 5:
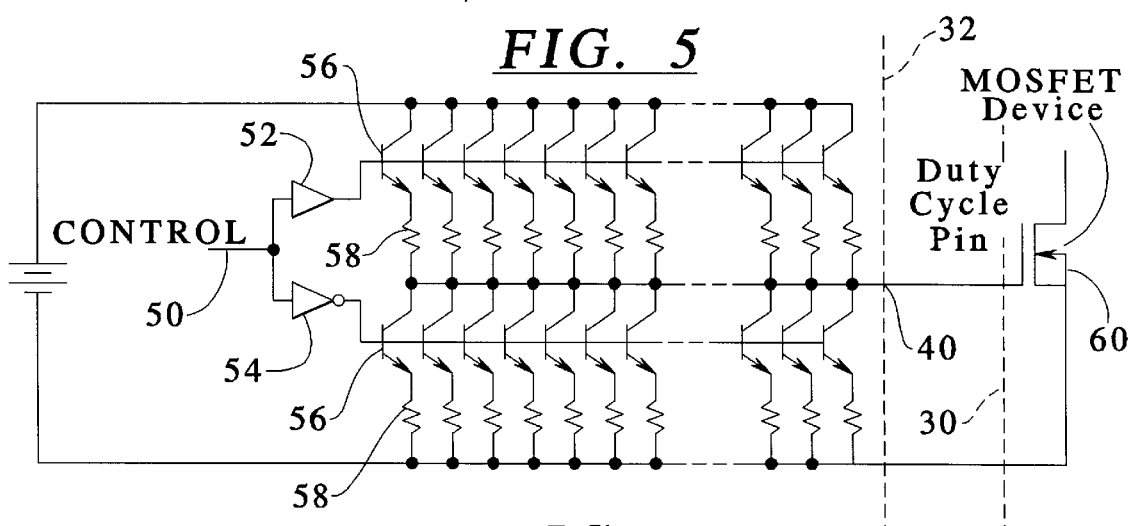
FIG. 5 is a circuit diagram of an output section of the switching regulator of FIG. 3.

To satisfy the high switching current demands of the MOSFET and bipolar switching elements in the power conversion circuit control inputs 42, a switching regulator or controller 32 must be provided with a high current capacity at its switching output 40. The switching regulator is preferably an integrated circuit. An example of an output circuit for a first embodiment of a switching regulator 32 is shown in FIG. 5. A control signal is received from a control input 50, fed through a buffer 52 and an inverter 54 and then to the bases of a large number of transistors 56 with emitter ballast resistors 58. The transistor 56 and resistor 58 structures are connected in parallel to satisfy the high current demands at the control output 40. The transistor 56 and resistor 58 structures shown above and below one another provide current sourcing and current sinking, respectively. As many as 100 or more transistor 56 and resistor 58 structures may be provided for sufficient current capacity, the large number of such structures being equivalent to larger single power transistors which would not be possible on an integrated circuit. The large number of such structures, however, result in higher costs for the integrated circuit regulator.

FIG. 5 also shows the MOSFET device 60 as the switching device at the input of the power converters 30. The MOSFET device 60 may be replaced by a bipolar transistor in some embodiments.

The figures of merit for a power converter are the output voltage Vd that is maintained, the output current available to the destination, and the efficiency with which the transfer of power is performed.

The present invention provides a method and apparatus to parallel multiple converters by directly connecting their inputs to the same source Vs and their outputs to the same destination Vd in a manner that does not compromise the efficiency by inserting additional elements, e.g. isolation resistors, in the power conversion path while directly maintaining the destination voltage Vd.

Figure 6:
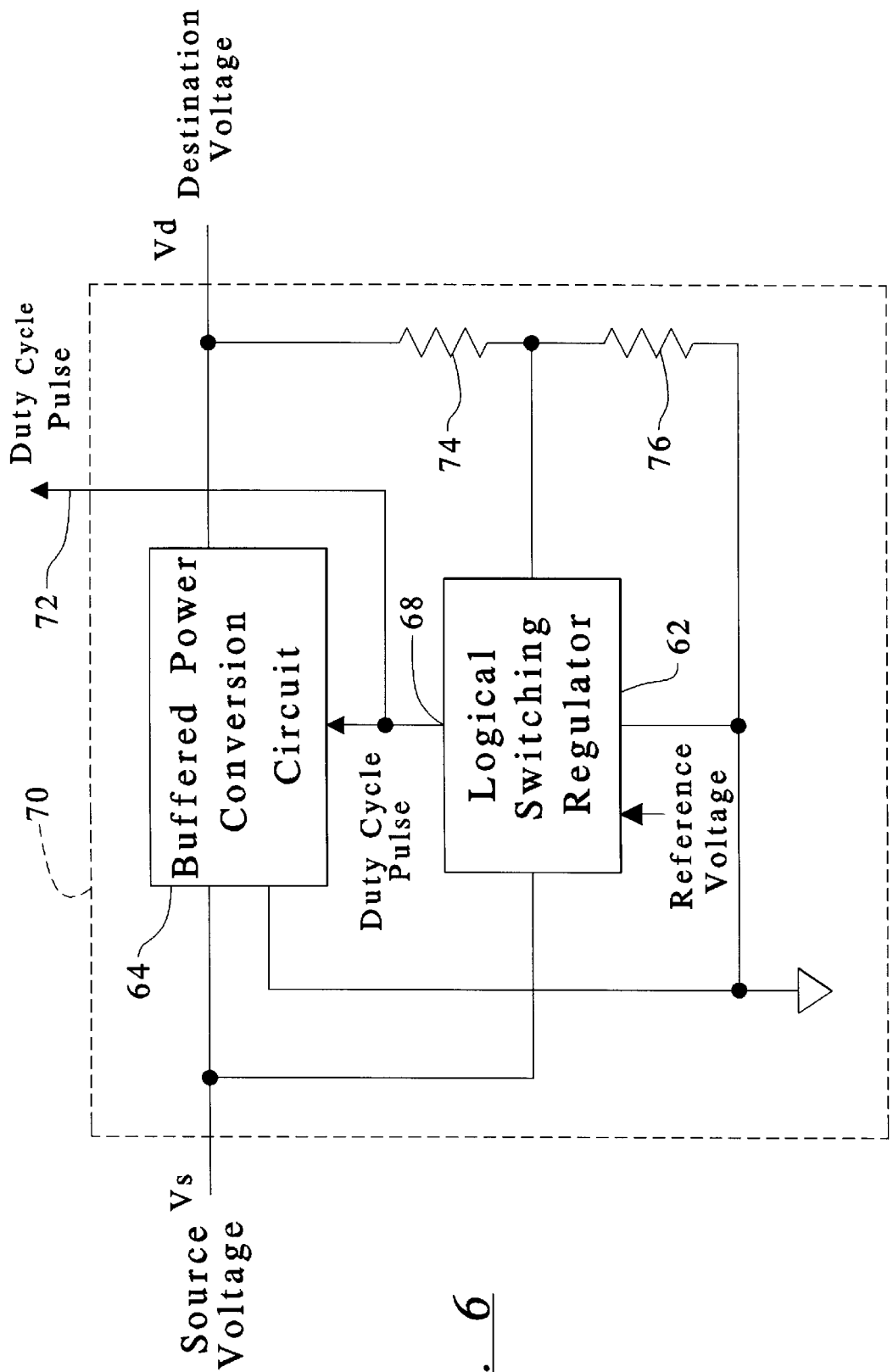
FIG. 6 is a functional block diagram showing of a master power converter unit according to the present invention.

In a preferred embodiment as shown in FIG. 6, the parallel architecture defines a is master converter 62 which consists of a switching regulator connected to a power conversion path. The difference in the master implementation with that of the above-described implementation of a converter 32 is that the duty cycle pulse produced by the switching regulator does not directly drive the switching elements 60 used in the power conversion circuit. Instead, the duty cycle pulse, or control pulse, is driving a high impedance buffer load in a power converter circuit 64 rather than a low impedance switching element 60, making it possible to drive multiple buffered switching elements 64 with little current drain.

Figure 7:
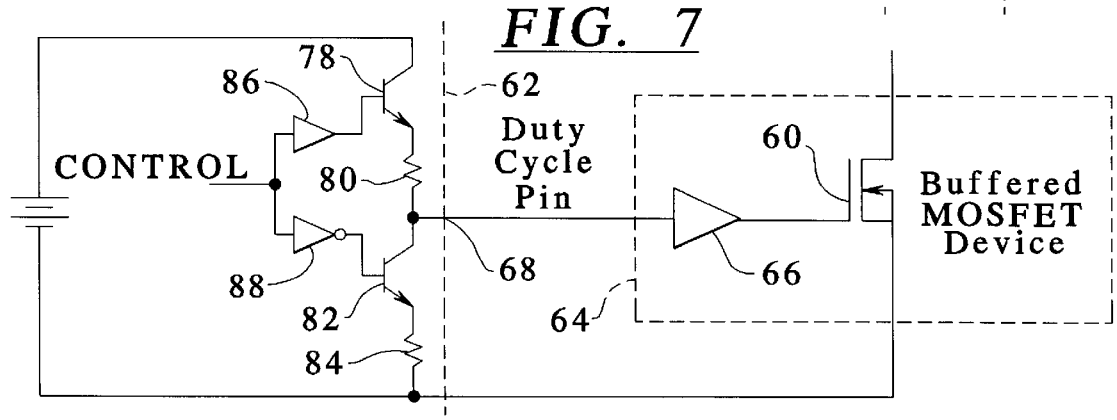
FIG. 7 is a circuit diagram of a switching regulator connected to a buffered converter according to the present invention.

In the previous switching regulators, the control output 40 directly drives the switching element 60 in the conversion circuit 30, therefore, the number of switching elements that could be driven by a switching regulator 32 is limited due to the design of the switching regulator and the low impedance nature of the switching elements 60. In addition, the design and manufacture of the switching regulator circuit 32 required the use of high current, effectively large physical transistors 56 to create the duty cycle signal or control output. According to the preferred embodiment, using a buffering circuit 66 as shown in FIG. 7 between the switching regulator 62 and the switching element 60 in all converters represents an important innovation of this invention. The buffer 66 has a high input impedance and outputs a signal to the switching element 60 in the buffered power conversion circuit 64.

Limiting the duty cycle pulse output 68 as shown in FIGS. 6 and 7 of the switching regulator 62 to driving only high impedance loads, the design criteria and the integrated circuit processing technology required to implement the switching regulator as an integrated circuit can be greatly reduced and result in a physically smaller switching regulator circuit to design and manufacture. This advantage defines a further innovation of this disclosure which provided that the switching regulator or controller 62 is a logical switching regulator, i.e. formed of logic circuitry rather than power circuitry. The logic circuitry is capable of providing duty cycle output signal or control signal for driving a number of buffered control inputs, since it does not directly drive a switching element used in the power conversion path.

The preferred implementation of a master converter 70 as shown in FIG. 6 includes the logical switching regulator 62 with a buffered switching element in the power conversion circuit 64. The master converter 70 provides all of the functionality of a typical converter embodiment with the addition of the duty cycle pulse output 72 from the logical switching regulator 62 presented as an output of the unit. Feedback resistors 74 and 76 are also provided.

The FIG. 7 shows the output section of the logical switching regulator 62 in detail. Only a single transistor 78 and resistor 80 are provided for current sourcing and a single transistor 82 and resistor 84 for current sinking. These are driven by the amplifier 86 and inverter amplifier 88 as above. Not only is the circuit simpler and smaller, but heat production is considerably reduced. Less heat also means higher reliability.

Figure 8:
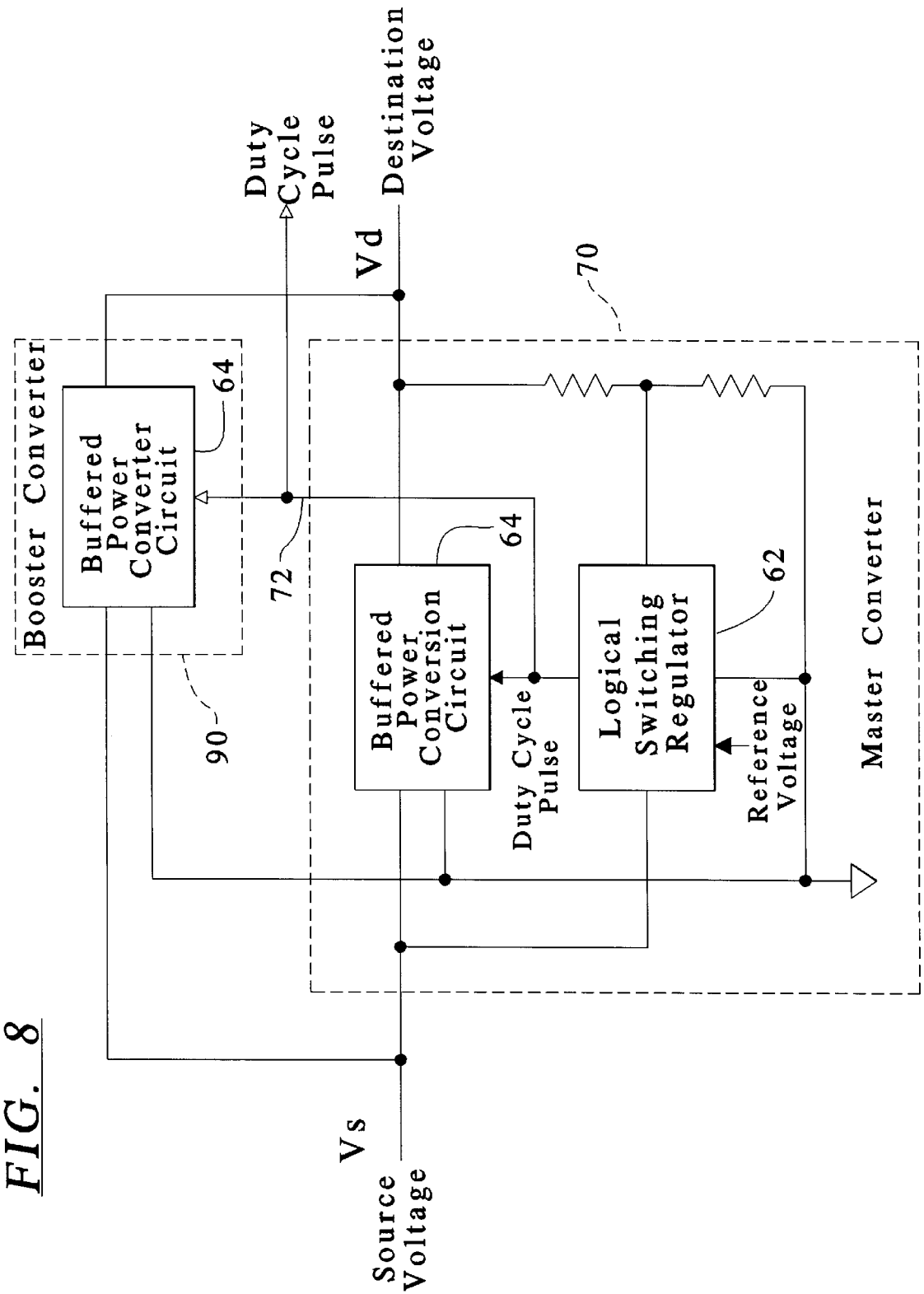
FIG. 8 is a functional block diagram showing the master power converter unit of FIG. 6 connected to a booster converter to provide parallel conversion paths.

The parallel power converting architecture as shown in FIG. 8 can now be achieved. One or more booster power converter circuits 90 may be connected in parallel with a single master converter arrangement 70. The parallel connection is defined to have common source Vs and destination Vd connections. The booster converter 90 consists only of a power conversion circuit 64 using a buffered switching element. The duty cycle pulse or control signal of the master controller 62 is connected to the buffered switching elements of the booster units 90. Using buffered switching elements 66 of identical design between the master converter 62 and the booster converters 90 results in near perfect current sharing between all converters in the parallel conversion paths. The ability to share current to the extent that the power conversion circuits 64 are matched is a further innovation of this invention, which is accomplished by this use of the buffered switching elements 66 and the master/booster architecture. Yet another innovation provided by this architecture is that only one switching regulator 62 is required to control multiple power conversion paths 64 using the buffered switching elements 66.

As many parallel conversion paths may be connected as needed for current sharing between the paths, according to the present invention.

Although other modifications and changes may be suggested by those skilled in the art, it is the intention of the inventors to embody within the patent warranted hereon all changes and modifications as reasonably and properly come within the scope of their contribution to the art.

We claim:

1. A parallel path power supply, comprising:

a master power converter unit having an input connected to a source and an output connected to a destination and a control output, said master power converter including:

a regulator connected to receive voltage levels from the source and from the destination and to output a control signal dependent upon differences between source voltage and destination voltage and reference voltage, said control signal being a duty cycle signal;

a first power converter connected in a first path between the source and the destination, said first power converter having a control input connected to receive said control signal from said regulator, said first power converter transferring power to maintain the destination voltage depending on a proportion of said duty cycle signal;

a second power converter connected in a second path between the source and the destination, said second path being parallel to said first path, said second power converter having a control input connected to receive said control signal from said regulator for common control with said first power converter, said second power converter transferring power to maintain the destination voltage depending on a proportion of said duty cycle signal.

2. A parallel path power supply as claimed in claim 1, wherein said first and second power converters each include a high impedance buffered input at said control input.

3. A parallel path power supply as claimed in claim 2, where said first and second power converters include a high impedance input of an amplifier at said control input.

4. A parallel path power supply as claimed in claim 1, wherein said regulator includes a control signal output section having a low current capacity.

5. A parallel path power supply as claimed in claim 1, further comprising:

at least one further power converter connected in at least one further path between the source and the destination, said at least one further path being parallel to said first path, said at least one further power converter having a control input connected to receive said control signal from said regulator for common control with said first power converter.

6. A parallel path power supply as claimed in claim 1, wherein said duty cycle signal has a proportional pulse every cycle.

\* \* \* \* \*